P. F. DEGENKOLB.
WIPER FOR WINDSHIELDS AND THE LIKE.
APPLICATION FILED APR. 20, 1920.
1,357,691.
Patented Nov. 2, 1920.
2 SHEETS—SHEET 1.
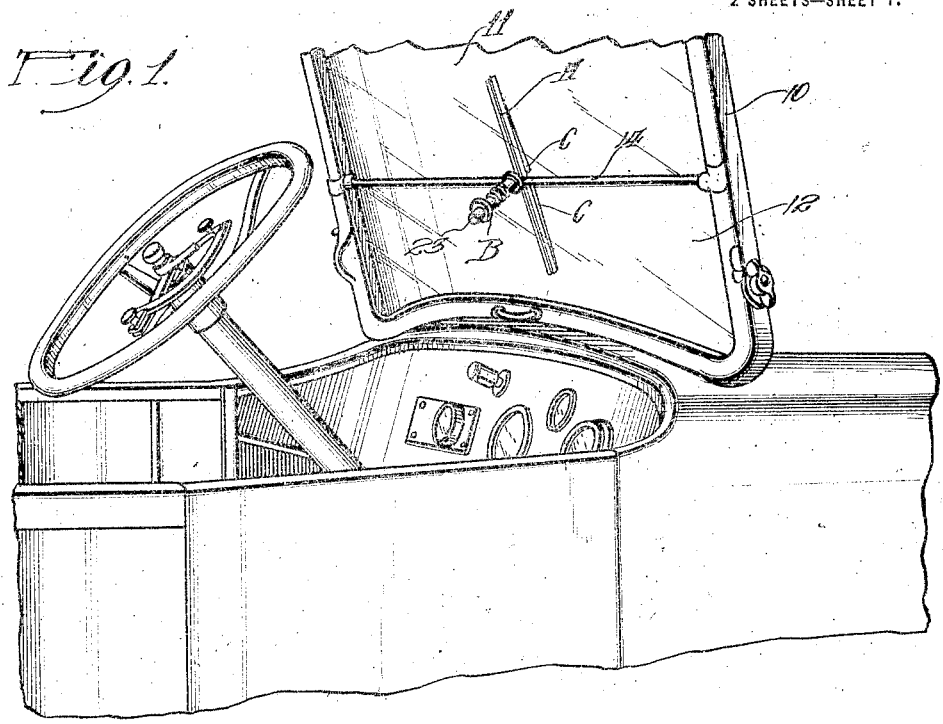
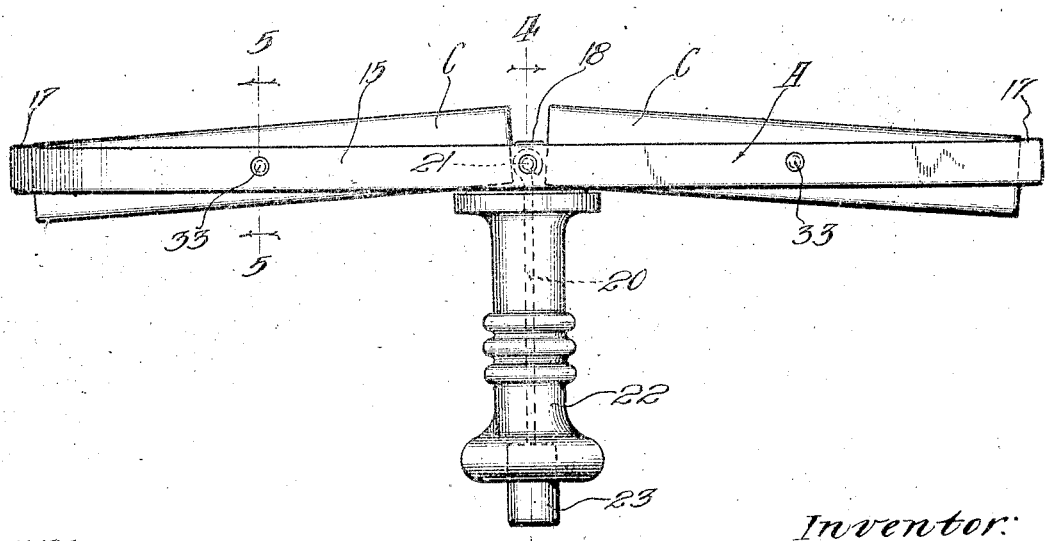
Witness:
Stephen F. Helwig
Inventor:
Paul F. Degenkolb

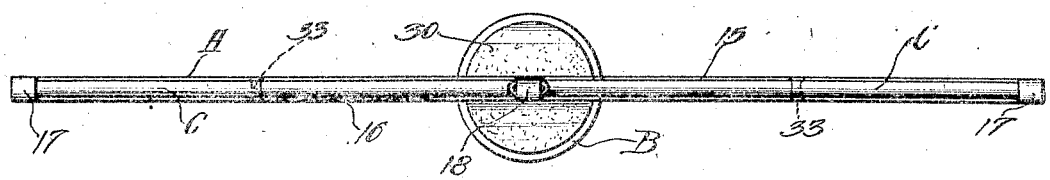

UNITED STATES PATENT OFFICE.

PAUL F. DEGENKOLB, OF ITASCA, ILLINOIS.

WIPER FOR WINDSHIELDS AND THE LIKE.

1,357,691.

Specification of Letters Patent.　Patented Nov. 2, 1920.

Application filed April 20, 1920. Serial No. 375,207.

*To all whom it may concern:*

Be it known that I, PAUL F. DEGENKOLB, a citizen of the United States, residing at Itasca, in the county of Dupage and State of Illinois, have invented certain new and useful Improvements in Wipers for Windshields and the like, of which the following is a specification.

This invention relates to a wiper designed particularly for use on the wind shield of an automobile, although its application to other uses is also contemplated. Among the general objects and advantages realized by this invention are relatively low cost of manufacture, ready application to either side of an automobile wind shield; adaptability to function under conditions when the two windows of the shield are in angular relation to each other; and in general freedom from vibration, reversibility in operation, etc. These and other objects are incidents of my invention, an exemplification of which is illustrated on the accompanying drawings in the manner following:

Figure 1 is a view in perspective of part of an automobile, exhibiting a wind shield to which is applied the present device;

Fig. 2 is a side elevation of the wiper *per se;*

Fig. 3 is an edge view thereof, the handle being shown in the background;

Fig. 4 is a transverse section through the device taken on line 4—4 of Fig. 2;

Fig. 5 is a similar view on line 5—5 of Fig. 2; and

Fig. 6 is a transverse section taken through a wind shield showing its two windows in angular relation with the wiper operatively positioned against each.

As already stated, the present device is adapted for wiping windows generally, but is especially suited for use with the wind shield of an automobile such as is represented in Fig. 1, wherein is shown a frame 10 having upper and lower windows 11 and 12 respectively, each adapted to be tilted within the frame in the usual manner, the two adjoining edges of the windows being slightly spaced apart as at 14.

The wiper includes in its construction a longitudinal frame A, preferably of sheet metal that is bent to provide a U-shaped cross section, with spaced sides 15 and 16 connected by relatively narrow webs 17, one at each end, and by a central web 18. Between these webs there is an open space, as best indicated in Fig. 3. A handle B is secured to the frame preferably by means of a shank 20 having one end bent to form an eye which encircles a pin 21 that is secured transversely between the two walls 15 and 16 adjacent the web 18. This shank is extended through the axial bore of the handle and carries at its extremity a button 23 to which it is connected as by means of screw threads 24. If desired, the axial bore of the handle may be provided with one or more radial slots 25 to receive in each a fin or wing 26 which projects laterally from the shank 20 so as to establish rotative continuity between itself and the handle. Interiorly of the handle there is also provided an enlarged chamber 27 within which is received a coiled spring 28 one end of which abuts against the chamber end 29, and the other against the button 23, the effect being to normally hold the frame tightly against the proximate end of the handle. It is preferred that a cushion or pad 30 be carried on the handle end which is adjacent the frame so as to provide a suitable surface for engaging with the window glass when the device is in use.

Mounted within the frame are two wipers C each formed alike and each reversible to present either of two wiping surfaces operatively to the window. These wipers may comprise in each instance a core 31 in the form of a plate around which is placed a tubing 32 of rubber or some other appropriate wiping material, the tubing being normally stretched over the core plate so as to remain tightly thereupon. Each plate and tubing is substantially of the same length and is designed to occupy practically the entire space between the central web 18 and one of the end webs 17. Each wiper may, furthermore, be secured in place as by means of a pin 33 which extends transversely between the two walls 15 and 16 through the mid point of the wiper permitting it to swing around within the frame, if desired, so as to present either of its wiping edges to the window.

The ends of the pins 33 are preferably in flush relation with the frame A. According to this construction, the frame may be formed relatively narrow so as to enter into the gap 14 which usually exists between the two windows 11 and 12 of a wind shield. If necessary this gap may be further increased by moving one window angularly of the other.

In use the device is positioned as shown in Fig. 1, being slipped into place through the gap 14 to present the frame A with its two wipers to one side of the window, the handle B remaining on the opposite side thereof. Positioning of the device is facilitated by a pressure of the thumb upon the button 23 which causes the frame to recede from the handle B sufficiently to permit the frame to lie to one side of the wind shield and the handle to the other (see Fig. 6). By rotating the handle, the device may be positioned vertically, as shown, following which it is ready for horizontal movements to effect a wiping of both windows at once, the shank 20 traversing the gap 14 during these operations. If the windows be angularly disposed to each other as suggested by full lines in Fig. 6, the two wipers will automatically aline themselves to wipe both windows at once, or if these windows be oppositely inclined, as represented by the dotted lines, the wipers will then assume a similar angle.

The device may be readily withdrawn from operative position upon being given a quarter turn to permit its withdrawal through the gap 14 whereupon the reverse edge of the wipers becomes effective to engage with the interior surface of the wind shield. If either wiping edge becomes worn out or otherwise unfit for use, the wiper may be reversed to present its opposite edge, thereby conducing to long service. The suggested construction of wiper by which a tubing is stretched over a core plate is advantageous in many ways, but may obviously be modified if some other construction be preferred. Also in other particulars the device may be changed or modified without departing from the spirit of this invention as defined by the appended claims.

I claim:

1. In a device of the kind described, the combination of a frame formed to provide spaced walls, two wipers one positioned in each end of the frame, a pivotal connection between each wiper and frame such that each wiper may be reversed therein, a shank connected with the frame and extending laterally thereof, and a handle carried by the shank and spring pressed toward the frame, substantially as described.

2. In a device of the kind described, the combination of a sheet metal frame bent to provide two sides each connected with the other by means of webs one at each end of the frame, and a third web in the middle portion of the frame, two pins extending transversely between the walls of the frame, one toward each end thereof, a wiper pivotally carried by each pin between the walls of the frame and adapted to be swung within the frame to any desired angular position relative thereto, a third pin arranged transversely between the walls of the frame in the middle portion thereof, a shank connected with the center pin and extending transversely from the frame, a handle into which the shank is entered, a button secured to the shank end and adapted to project beyond the handle, and a spring surrounding the shank and presenting one end to the button and its other end to a wall within the handle whereby the handle is normally held toward the frame, substantially as described.

3. In a device of the kind described, the combination of a frame, a pair of pivotally mounted wipers carried by the frame, each wiper comprising a core plate and a tubing of wiping material surrounding the core plate, and a handle yieldingly held toward the frame adapted for manipulation of the latter, substantially as described.

4. In a device of the kind described, the combination of a frame formed to provide a pair of spaced walls, a pair of wipers arranged in end to end relation within the frame, each wiper comprising a core plate surrounded with a wiping material, a pivotal connection between each wiper and the frame such that the wipers may be swung angularly of the frame, and a handle projected from the frame having spring means for normally holding the handle toward the frame, substantially as described.

5. In a device of the kind described, the combination of a frame, two wipers pivotally mounted therein and arranged to present their ends in adjacent relation, each of the wipers being reversible in the frame, and a handle connected with the frame to rotate therewith, substantially as described.

6. In a device of the kind described, the combination of two wipers in end to end relation, a frame to which the wipers are swingingly secured, a shank secured to the frame extending laterally therefrom, the shank being held against rotation relative to the frame, and a handle carried by the shank spring pressed toward the frame, the handle being formed to lock non-rotatably with the shank whereby rotative movement may be communicated from the handle to the frame, substantially as described.

7. In a device of the kind described, the combination of a sheet metal frame bent to provide two sides, each connected with the other at their ends, two wipers arranged in end to end relation between the sides and swingingly mounted therein, and a handle extended laterally from the middle portion of the frame having means for yieldingly holding itself toward the frame, substantially as described.

8. In a device of the kind described, the combination of a frame consisting of two sides connected at their ends, two wipers arranged in end to end relation between the sides and swingingly secured thereto, and a handle yieldingly held toward the frame and connected to rotate therewith, substantially as described.

PAUL F. DEGENKOLB.

Witness:
EPHRAIM BANNING.